US012513093B2

(12) United States Patent
Draznin

(10) Patent No.: US 12,513,093 B2
(45) Date of Patent: Dec. 30, 2025

(54) DYNAMIC CLOUD OFFLOADING

(71) Applicant: Microsoft Technology Licensing, LLC, Redmond, WA (US)

(72) Inventor: Sagiv Draznin, Walnut Creek, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/708,074

(22) Filed: Mar. 30, 2022

(65) Prior Publication Data

US 2023/0318986 A1 Oct. 5, 2023

(51) Int. Cl.
*H04L 47/762* (2022.01)
*H04L 47/72* (2022.01)
*H04L 47/78* (2022.01)
*H04L 47/80* (2022.01)

(52) U.S. Cl.
CPC .......... *H04L 47/762* (2013.01); *H04L 47/72* (2013.01); *H04L 47/781* (2013.01); *H04L 47/803* (2013.01)

(58) Field of Classification Search
CPC ..... H04L 47/762; H04L 47/72; H04L 47/781; H04L 47/803
See application file for complete search history.

(56) References Cited

U.S. PATENT DOCUMENTS

| | | | | |
|---|---|---|---|---|
| 7,284,119 B2* | 10/2007 | Hyder | ................... | H04L 69/321 709/219 |
| 8,527,991 B2* | 9/2013 | Hilton | ................... | G06F 9/5033 718/100 |
| 9,210,031 B1* | 12/2015 | Kirby | ................... | H04L 41/0806 |
| 10,616,127 B1* | 4/2020 | Suit | ...................... | G06F 9/45558 |
| 11,093,227 B1* | 8/2021 | Shteyman | ............... | H04L 67/34 |
| 2015/0324215 A1* | 11/2015 | Borthakur | ........... | G06F 9/45558 718/1 |
| 2016/0088070 A1* | 3/2016 | Kirby | ................... | H04L 41/022 709/217 |
| 2017/0013021 A1* | 1/2017 | Hoy | ..................... | H04L 63/0209 |
| 2018/0081731 A1* | 3/2018 | Nirantar | ................ | G06F 9/5027 |

(Continued)

FOREIGN PATENT DOCUMENTS

CN 111124652 A 5/2020

OTHER PUBLICATIONS

"International Search Report and Written Opinion issued in PCT Application No. PCT/US22/054011", Mailed Date: Apr. 11, 2023, 14 Pages.

*Primary Examiner* — Glenton B Burgess
*Assistant Examiner* — Jihad K Boustany

(57) ABSTRACT

A dynamic offloading system is provided, which monitors resource demand by one or more applications executing on an on-prem server and supply of curated cloud space on one or more registered cloud service providers to automatically create an instance and offload applications associated with spikes in the resource demand. The curated cloud space may be preconfigured for specific processing and/or more general processing. For instance, the curated cloud space may be preconfigured for offloading service applications associated with mobile traffic, which may include specific resource requirements, time or service constraints, provisioning, testing or validation. Additionally, the curated cloud space may be preconfigured for offloading websites or databases, which may have more generalized resource requirements, provisioning, testing or validation.

16 Claims, 9 Drawing Sheets

(56) References Cited

U.S. PATENT DOCUMENTS

| | | | |
|---|---|---|---|
| 2020/0250008 A1* | 8/2020 | Cleave | H04H 20/74 |
| 2021/0065090 A1* | 3/2021 | Chatterjee | G06N 5/01 |
| 2021/0112017 A1* | 4/2021 | Gupta | H04L 45/24 |
| 2021/0278986 A1* | 9/2021 | Yamamoto | G06F 9/45558 |
| 2022/0156114 A1* | 5/2022 | Nagpal | G06F 11/3409 |
| 2022/0400085 A1* | 12/2022 | Ananthanarayanan | G06F 9/505 |

* cited by examiner

DYNAMIC CLOUD OFFLOADING

BACKGROUND

Multi-access Edge Computing (MEC) has become important to improve performance of cloud services. For instance, MEC brings applications from centralized data centers to the network edge, closer to end users. In aspects, a MEC may comprise a radio-access network ("RAN") as part of a mobile wireless telecommunications system. The RAN, in combination with a core network of a cloud service provider, represents a backbone network for mobile wireless telecommunications. According to 5G specifications, a RAN includes at least a radio unit (RU), a distributed unit (DU), a central unit (CU), and a RAN intelligent controller (RIC). Cell towers transmit and receive radio signals to communicate with mobile devices (e.g., smartphones) over radio (e.g., 5G). RUs at one or more cell towers connect to a DU at an on-premises edge of the cloud RAN. The term "on-premises edge server" (or "on-prem server") may refer to a computing system at a remote location at the far-edge of a private cloud, which is in proximity to the one or more cell towers.

In addition to processing RAN traffic (e.g., mobile telecommunications), an on-prem server may also execute various service applications that perform different functions, such as network monitoring, video streaming, localization tracking, video analytics, etc. These distributed on-prem servers are equipped with memory and core processing to handle traffic load under normal circumstances. However, transient events (e.g., concerts, sport attractions, etc.) can increase load substantially (e.g., two- or three-times standard traffic) for a short period of time. If not addressed, the transient event can cause the on-prem server to crash, disrupting all services handled by the system.

To address these transient situations, the resources of an on-prem server may be significantly increased. However, this solution is not only expensive in terms of monetary cost and physical space, but the additional resources are idle most of the time. Alternatively, an instance on a public cloud network may be requested for offloading workloads. This solution is also unsatisfactory because creation of instances on the public cloud requires adequate tenant space, IP address allocation, security requirements, provisioning, specific configurations, and testing and/or validation—which can take hours or even days. Accordingly, it is impractical to create an instance in a public cloud to quickly offload spiking traffic, especially in the case of time-sensitive RAN traffic.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to dynamically offloading traffic from a private cloud to a public cloud.

In an aspect, a method for dynamically offloading traffic from a private server to a public server is provided. The method includes monitoring a resource utilization of an application executing on a private server, where the application is configured to perform at least one operation based on an application specification. Additionally, in response to determining that the resource utilization of the application meets a utilization threshold, the method includes identifying a public server having a reserved resource space that is preconfigured to sufficiently support at least a portion of the application specification. The method further includes automatically creating an instance on the preconfigured resource space of the public server and automatically offloading the application to the preconfigured resource space of the public server.

In another aspect, a system for preconfiguring a resource space on a public server is provided. The system includes computer-executable instructions that when executed by a processor cause the system to perform operations. The operations include receiving a plurality of application specifications, where each application specification defines one or more parameters for executing a particular application or a type of application. The operations further include reserving resource space on a public server and preconfiguring the reserved resource space based on the received plurality of application specifications. Additionally, the operations include receiving a request to offload an application from a private server to the preconfigured resource space of the public server, where the application is associated with an application specification. The operations further include determining that the preconfigured resource space supports at least a portion of the application specification and automatically creating an instance on the preconfigured resource space.

In yet another aspect, a system for dynamically offloading traffic from a private server to a public server is provided. The system includes computer-executable instructions that when executed by a processor cause the system to perform operations. The operations include monitoring a resource utilization of an application executing on a private server, where the application is configured to perform at least one operation based on an application specification. In response to determining that the resource utilization of the application meets a utilization threshold, the operations include identifying a public server having a reserved resource space that is preconfigured to sufficiently support at least a portion of the application specification. Additionally, the operations include determining an available capacity of the preconfigured resource space on the public server. In response to determining that the preconfigured resource space has available capacity, the operations include automatically creating an instance on the preconfigured resource space of the public server and automatically offloading the at least one application to the preconfigured resource space of the public server.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
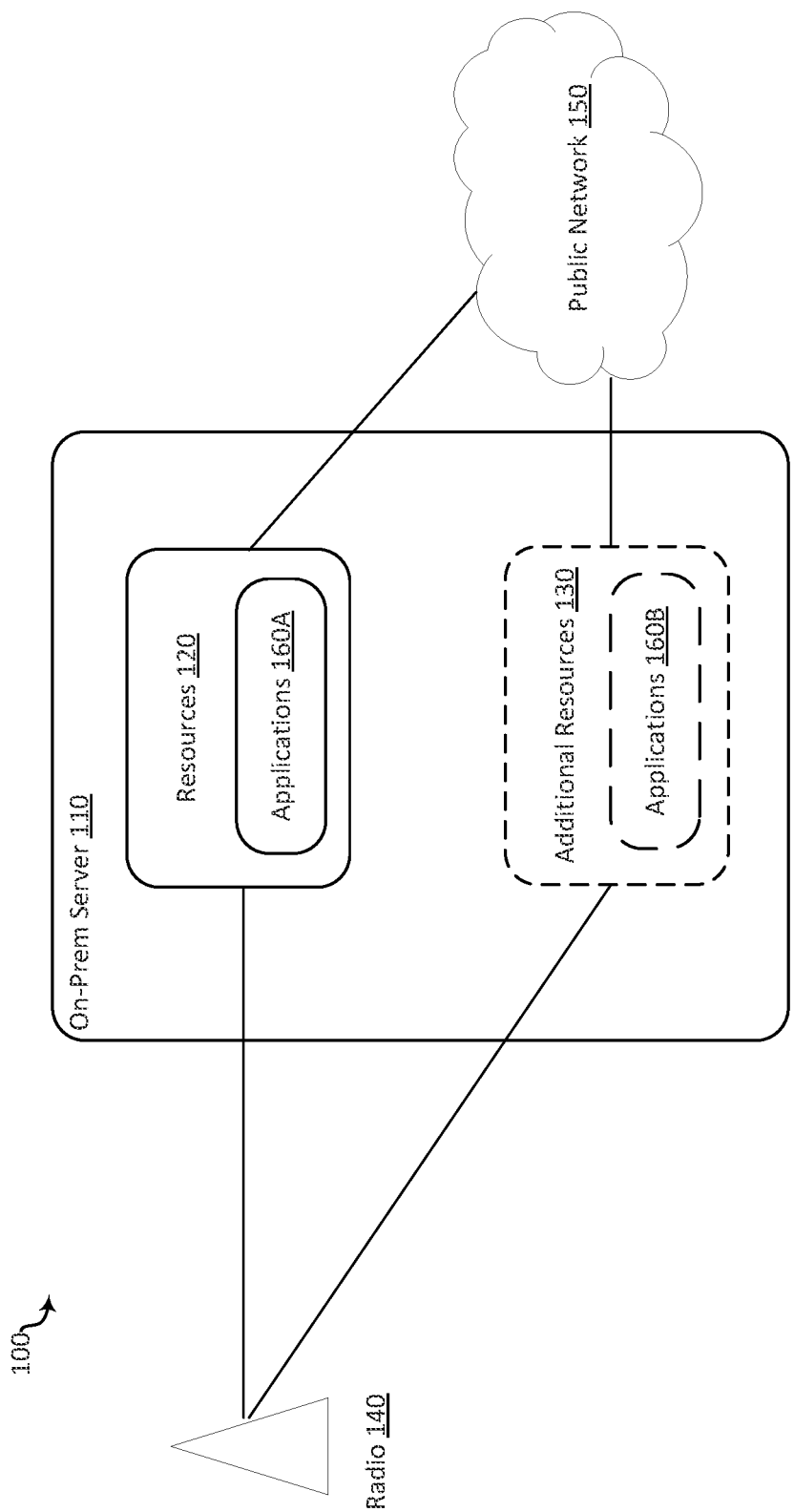
FIG. 1 shows a block diagram of a first MEC configuration, according to an example aspect.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Aspects of the present disclosure relate to offloading workloads (e.g., service applications) from an "on-premises" edge server (or "on-prem" server) to a public cloud server. For example, an on-prem server may support a private cloud network interfacing with a radio-access network ("RAN") as part of a mobile wireless telecommunications system. With the advent of 5G, which is a system of mobile communications that improved upon aspects of the previous 4G system (reduced latency, increased bandwidth, etc.), the scope of mobile networks has increased to provide a broad range of wireless services delivered across multiple platforms and multi-layer networks. 5G specifications outline a host of performance requirements related to bandwidth, peak data rate, energy efficiency, reliability, latency (both user-plane and control-plane latency), traffic capacity, etc. To meet these requirements, the RAN architecture has expanded. For instance, Multi-Access Edge Computing (MEC) brings applications from centralized data centers to the network edge, closer to end users. Distributing computing power to on-prem edge servers enables the high volume of 5G devices and facilitates disaggregated, virtual RANs to create additional access points. However, to facilitate geographic proximity to end users, on-prem servers are often physically constrained, which limits their memory and computing resources. In contrast, based on the distributed architecture of a public cloud network, cloud servers may have access to significantly more processing and memory resources than the on-prem servers.

In aspects, the memory and processing constraints of on-prem servers can create issues. In addition to processing RAN traffic (e.g., mobile telecommunications), on-prem servers may also execute various service applications that perform different functions, such as network monitoring, video streaming, localization tracking, video analytics, etc. These services may further extend to hosting websites and/or databases, for instance. Under normal circumstances, these distributed on-prem servers are equipped with memory and core processing to handle the load associated with RAN traffic and/or service applications. However, transient events (e.g., concerts, sport attractions, etc.) can increase load substantially (e.g., two- or three-times standard traffic) for a short period of time. If not addressed, the transient event can cause the on-prem server to crash, disrupting all services handled by the system.

As described above, to address these transient situations, the resources of an on-prem server may be significantly increased. However, this solution is not only expensive in terms of monetary cost and physical space, but adding resources takes time and these additional resources may often be idle. Alternatively, an instance on a public cloud network may be requested for offloading workloads. This solution is also unsatisfactory because creation of instances on the public cloud requires adequate tenant space, IP address allocation, security requirements, provisioning, specific configurations, and testing and/or validation—which can take hours or even days. Accordingly, it is impractical to create an instance in a public cloud to quickly offload spiking traffic, especially in the case of time-sensitive RAN traffic.

To overcome issues associated with previous solutions, a dynamic offloading system is provided. In aspects, the system monitors resource demand (e.g., resource utilization) by one or more applications executing on an on-prem server and supply (e.g., curated cloud space) on one or more registered cloud service providers to automatically create an instance and offload applications associated with spikes in the resource demand. The curated cloud space may be preconfigured for specific processing and/or more general processing. For instance, the curated cloud space may be preconfigured for offloading service applications associated with mobile traffic, which may include specific resource requirements, time or service constraints, provisioning, testing or validation, and the like. Additionally or alternatively, the curated cloud space may be preconfigured for offloading websites or databases, for instance, which may have more generalized resource requirements, provisioning, testing or validation, and the like.

This and many further embodiments for a MEC system are described herein. For instance, FIG. 1 shows a block diagram of a first MEC configuration, according to an example aspect. For instance, the first MEC may comprise a radio-access network ("RAN") as part of a mobile wireless telecommunications system. As illustrated, MEC system 100 includes an on-prem server 110 having resources 120. The on-prem server 110 may be a computing system at a remote location at the far-edge of a private cloud, which is in proximity to one or more cell towers represented by radio 140. In aspects, resources 120 may comprise at least memory and core processing. On-prem server 110 may be configured to execute one or more applications 160A (e.g., workloads), which may communicate with a public network 150 (e.g., the Internet). For instance, the applications 160A may be responsible for processing or relaying mobile communications or for providing services such as network monitoring, video streaming, localization tracking, video analytics, websites, databases, etc. Execution of the applications 160A may utilize the resources 120.

In some cases, the on-prem server 110 may experience spikes in RAN traffic due to transient events (e.g., concerts, sport attractions, etc.), which can increase load substantially (e.g., two- or three-times standard traffic) for a short period of time. For instance, resources 120 may be utilized near capacity, including processing at near CPU capacity (e.g., 90% or above) and/or running the bulk of supportable network sessions (e.g., 900 sessions of 1000 sessions). If not addressed, the transient event can cause the on-prem server 110 to crash, disrupting all services handled by the system (e.g., network monitoring, video streaming, localization tracking, video analytics, websites, databases, etc.). As illustrated by FIG. 1, additional resources 130 may optionally be added to meet the spike in resource demand. In aspects, at least a subset of applications 160A (e.g., applications 160B) may be offloaded from resources 120 for execution on resources 130. However, this solution is expensive in terms of monetary cost and physical space at on-prem server 110. Not only so, adding additional resources 130 takes time (which may be impractical for time-sensitive applications) and additional resources 130 may often be idle between transient events (which is inefficient and wasteful).

Figure 2:
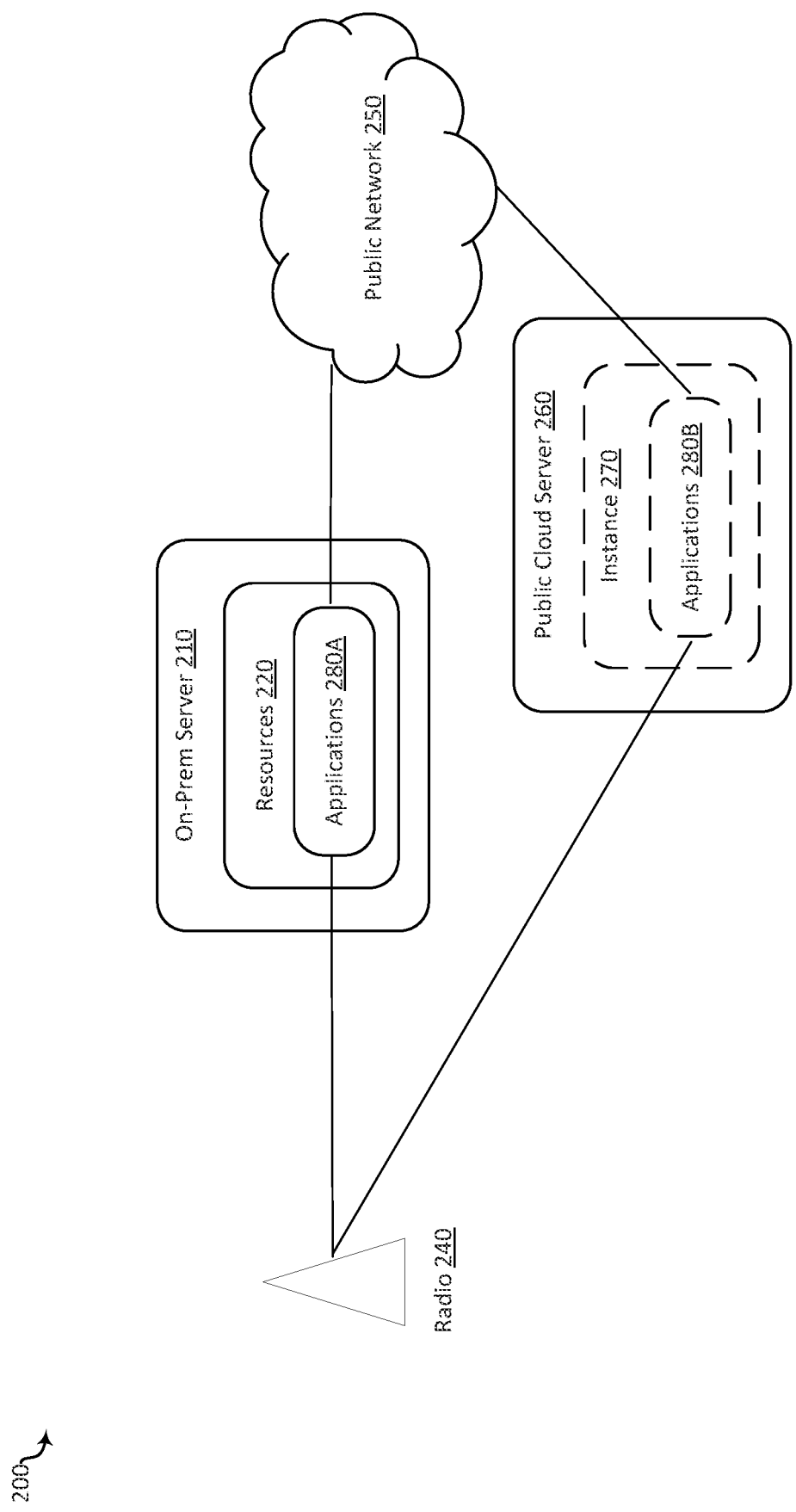
FIG. 2 shows a block diagram of a second MEC configuration, according to an example aspect.

In contrast, FIG. 2 shows a block diagram of a second MEC configuration, according to an example aspect. Similar to the first MEC, the second MEC may comprise a radio-access network ("RAN") as part of a mobile wireless telecommunications system. As illustrated, MEC system 200 includes an on-prem server 210 having resources 220. The on-prem server 210 may be a computing system at a remote location at the far-edge of a private cloud, which is in proximity to one or more cell towers represented by radio 240. On-prem server 210 may comprise one or more components described with respect to computing system 700 illustrated and described by FIG. 7. In aspects, resources 220 may comprise at least memory and core processing, as described further with respect to FIG. 7. On-prem server 210 may be configured to execute one or more applications 280A (e.g., workloads), which may communicate with a public network 250 (e.g., the Internet). For instance, the applications 280A may be responsible for processing or relaying mobile communications or for providing services such as network monitoring, video streaming, localization tracking, video analytics, websites, databases, etc. Execution of the applications 280A may utilize the resources 220.

In some cases, similar to on-prem server 110, on-prem server 210 may experience spikes in RAN traffic due to transient events (e.g., concerts, sport attractions, etc.), which can increase load substantially (e.g., two- or three-times standard traffic) for a short period of time. For instance, resources 220 may be utilized near capacity, including processing at near CPU capacity (e.g., 90% or above) and/or running the bulk of supportable network sessions (e.g., 900 sessions of 1000 sessions). If not addressed, the transient event can cause the on-prem server 210 to crash, disrupting all services handled by the system (e.g., network monitoring, video streaming, localization tracking, video analytics, websites, databases, etc.). As should be appreciated, thresholds associated with 90% CPU usage and/or 900/1000 sessions are indicated as examples only. The threshold percentage usage and/or the threshold number of sessions may depend on resource capacity at the on-prem server 210 and, in at least some examples, may be user configurable. As such, any threshold percentage usage, threshold number of sessions, or other indicator of resource utilization may be employed.

In contrast to FIG. 1, FIG. 2 illustrates offloading at least a subset of applications 280A (e.g., applications 280B) to an instance 270 on public cloud server 260 to meet the spike in resource demand. In aspects, instance 270 may be created in a curated cloud space of public cloud server 260. The curated cloud space may be preconfigured for specific types of processing and/or more general processing. For instance, the curated cloud space may be preconfigured for offloading service applications associated with mobile traffic, which may include specific resource requirements, time or service constraints, provisioning, and testing or validation. Additionally or alternatively, the curated cloud space may be preconfigured for offloading websites or databases, for instance, which may have more generalized resource requirements, provisioning, and testing or validation. Since the curated cloud space is preconfigured for specialized and/or generalized application requirements, the instance 270 may be created quickly and applications 280B may be offloaded efficiently and seamlessly so as to minimize latency. In at least some examples, when resource utilization by applications 280A is reduced, applications 280B may be onloaded back to on-prem server 210. In this way, when they are no longer needed, resources associated with instance 270 may be released from the curated cloud space on public cloud server 260.

Figure 3:
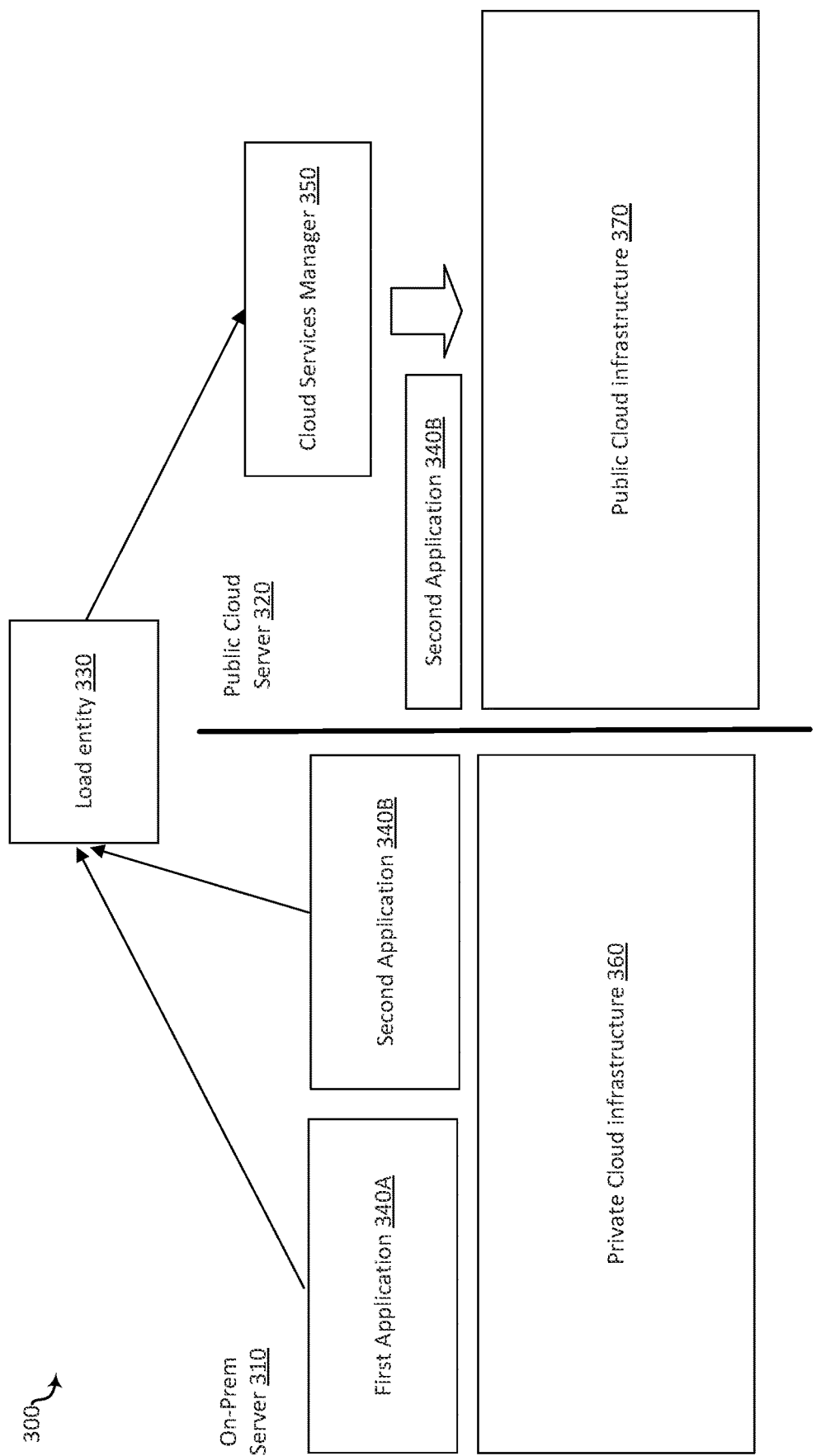
FIG. 3 shows a block diagram of a system for dynamically off-loading traffic to the public cloud, according to an example embodiment.

FIG. 3 shows a block diagram of a system 300 for dynamically off-loading traffic to a public cloud infrastructure, according to an example embodiment.

As illustrated, system 300 comprises on-prem server 310 and public cloud server 320, which may have the same or similar functionality to those described with respect to FIG. 1 and FIG. 2. In aspects, on-prem server 310 may comprise one or more resources (e.g., resources 120, 220) for supporting private cloud infrastructure 360. As described above, the private cloud infrastructure 360 may execute one or more applications (e.g., first application 340A and second application 340B) utilizing the one or more resources (e.g., resources 120, 220). Public cloud server 320 may also comprise one or more resources for supporting public cloud infrastructure 370. As noted above, on-prem server 310 may be physically constrained, limiting its memory and computing resources. In contrast, based on the distributed architecture of the public cloud infrastructure 370, public cloud server 320 may have access to significantly more processing and memory resources than on-prem server 310. In aspects, on-prem server 310 and public cloud server 320 may comprise one or more components described with respect to computing system 700 illustrated and described by FIG. 7. In aspects, the one or more resources may comprise at least memory and core processing, as described further with respect to FIG. 7.

System 300 further includes a load entity 330. In aspects, load entity 330 may be an application installed on the on-prem server 310 that acts as an application programming interface (API) and/or a protocol-level communicator between the on-prem server 310 and one or more public cloud servers 320 that support a public cloud infrastructure 370. The load entity 330 may not be an on-prem load balancer, nor may any traffic be routed through load entity 330. In contrast, load entity 330 may monitor resource utilization by the on-prem server 310 and, in response to determining that the resource utilization meets or exceeds a resource utilization threshold, the load entity 330 may communicate with a cloud services manager 350 to offload traffic associated with one or more applications, e.g., application 340B. In aspects, monitoring resource utilization may comprise receiving reports from one or more applications executing on the on-prem server 310. A report may include resource usage data for an application and may be received in substantially real-time, on a periodic basis, in response to an event, or according to any other schedule or prompt. A report may pushed from an application or pulled in response to a request by load entity 330. In aspects, a report for an application may be evaluated by load entity 330 to determine whether the resource utilization of an application meets or exceeds a utilization threshold, in which case the application may be identified for offloading to the public cloud infrastructure 370.

The cloud services manager 350 may manage one or more registered cloud service providers (not shown) associated with public cloud infrastructure 370. Each registered cloud service provider may be associated with one or more public cloud servers 320. For instance, a registered cloud service provider may preconfigure and reserve resources (e.g., associated with one or more associated public cloud servers 320) that are sufficient to generally meet application specifications of multiple on-prem systems. The multiple on-prem systems may service different customers (e.g., users or organizations) and each may be associated with one or more on-prem servers 310 that support a private cloud infrastructure 360.

Since the resources are configured in advance, much of the delay is eliminated in creating an instance on the reserved resources associated with the public cloud infrastructure 370. Furthermore, since the resources are preconfigured to be "sufficient" to meet the application specifications of multiple on-prem systems, the registered cloud service providers may reserve and configure different resources to generally meet different customer needs, such as mobile traffic offload vs. database offload vs. website offload, etc. In aspects, a "sufficient preconfiguration" may refer to preconfiguring resources to meet at least a subset of the application specifications for an application or a type of application for a temporary period of time. Preconfiguring resources may include advance performance various actions that may be required for creating an instance on the reserved resource space, including reserving adequate tenant space, performing IP address allocation, satisfying security requirements, provisioning the reserved resource space, and performing testing and/or validation.

In response to a communication from load entity 330, cloud services manager 350 may evaluate resource supply and identify one or more registered cloud service providers having capacity in a reserved resource space. When cloud services manager 350 identifies a registered cloud service provider having adequate resource capacity, the cloud services manager 350 may orchestrate creation of an instance on the reserved resource space for offloading traffic associated with the application, e.g., second application 340B. In this way, during spikes in resource demand at on-prem server 310, traffic associated with one or more applications (e.g., second application 340B) may be quickly and seamlessly offloaded to the public cloud infrastructure 370. As a result, the on-prem server 310 may be prevented from crashing, while processing continuity for the application 340B may be maintained with little interruption and latencies associate with offloading the traffic may be minimized.

Load entity 330 may continue to monitor the resource utilization of on-prem server 310 and, in response to determining that the resource utilization falls below the threshold, the load entity 330 may communicate with cloud services manager 350 to migrate the at least one application, e.g., application 340B, back to on-prem server 310. In this way, the preconfigured resources associated with the registered service provider are efficiently freed when they are no longer needed. In further aspects, since utilization of the preconfigured resources is transient for offloaded applications, the cloud service provider can maximize the number of customers for particular reserved resources, which are preconfigured to support different applications or applications for different customers that have the same or similar application specifications.

Figure 4:
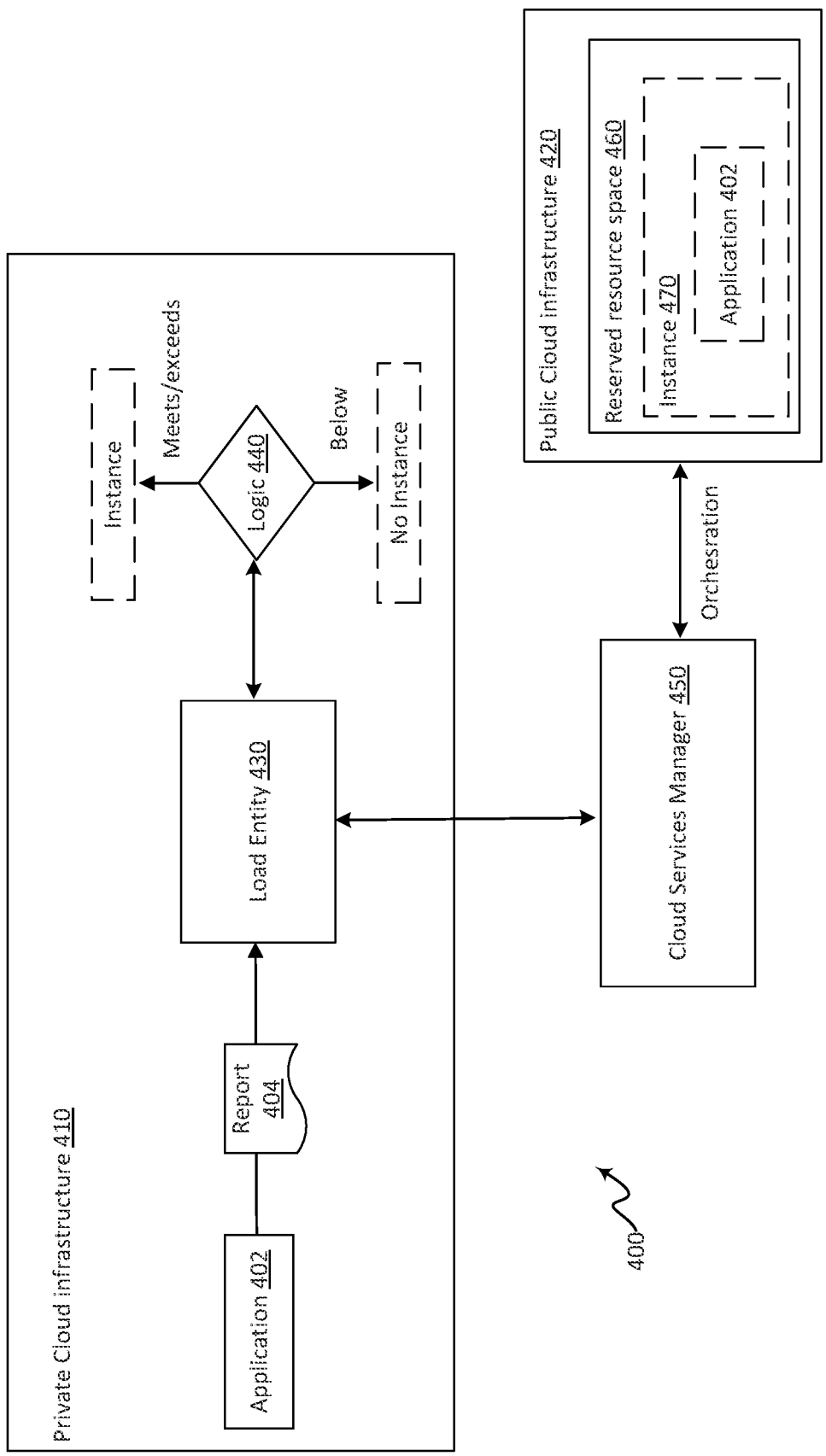
FIG. 4 shows a block diagram of an example flow for dynamically off-loading traffic to the public cloud, according to an example embodiment.

FIG. 4 shows a block diagram of an example flow for dynamically off-loading traffic to the public cloud, according to an example embodiment.

As illustrated, flow 400 comprises a flow of information, evaluation, and orchestration between a private cloud infrastructure 410 and a public cloud infrastructure 420. Private cloud infrastructure 410 may be supported by one or more on-prem servers (see e.g., FIGS. 1-3) and public cloud infrastructure 420 may be supported by one or more public cloud servers (see e.g., FIGS. 2-3). In aspects, the private cloud infrastructure 410 and the public cloud infrastructure 420 may comprise one or more resources (e.g., resources 120, 220) for executing applications. As illustrated, the private cloud infrastructure 410 may execute at least one application (e.g., application 402) utilizing the one or more resources.

In aspects, a load entity 430 may receive a report 404 from an application 402 executing on the private cloud infrastructure 410. In aspects, the report 404 may include resource usage data for the application 402. For instance, the report may indicate a resource utilization for application 402 of 85% CPU capacity and/or 50 of 100 sessions. In aspects, report 404 for application 402 may be evaluated by load entity 430 to determine whether the resource usage data for application 402 meets or exceeds a utilization threshold, in which case application 402 may be identified for offloading to the public cloud infrastructure 420. In further aspects, load entity 430 may employ business logic 440 to evaluate resource usage data of application 402.

For instance, business logic 440 may use a hysteresis model to evaluate resource usage data of application 402 to determine whether the resource utilization of application 402 is above or below a utilization threshold. The hysteresis model may consider past behavior of application 402 and/or private cloud infrastructure 410 to determine whether the resource utilization of application 402 is currently above or below the utilization threshold and/or determine whether the resource utilization of application 402 is predicted to be above or below the utilization threshold within a predetermined period of time. In further examples, business logic 440 may use a machine-learned (ML) model to anticipate significant increases in resource utilization for application 402 before the utilization threshold is reached. For instance, the ML model may be trained to anticipate increases in resource utilization based on a slope of increase of the resource usage data, detecting an increasing number of mobile phones nearby, evaluating local event calendar information, and the like.

As described above, in response to employing business logic 440, load entity 430 may determine that the resource utilization of application 402 is (or is predicted to be) above or below the utilization threshold. When the resource utilization of application 402 meets or exceeds the utilization threshold, load entity 430 may determine that an instance should be created on public cloud infrastructure 420. For example, when the resource utilization of application 402 meets or exceeds 85% CPU capacity and/or 50 of 100 sessions, it may be determined that an instance (e.g., instance 470) should be created on public cloud infrastructure 420. Alternatively, when the resource utilization of application 402 is (or is predicted to be) below the utilization threshold, load entity 430 may either determine that an instance should not be created or that a created instance (e.g., instance 470) should be destroyed on the public cloud infrastructure 420. For example, when the resource utilization of application 402 is below 85% CPU capacity (e.g., 70% CPU capacity) and/or 50 of 100 sessions (e.g., 25 of 100 sessions), it may be determined that an instance should not be created (or should be destroyed) on public cloud infrastructure 420.

Upon determining that application 402 meets or exceeds the utilization threshold, load entity 430 may communicate with a cloud services manager 450 associated with one or more registered cloud service providers of public cloud infrastructure 420. For example, the cloud services manager 450 may evaluate resource supply and identify one or more registered cloud service providers having resource capacity on a reserved resource space 460. As should be appreciated, at any time, reserved resource space associated with a particular cloud service provider may be occupied by one or more on-prem systems (e.g., customers). Accordingly, it is contemplated that cloud services manager 450 may have relationships with multiple cloud service providers to ensure dynamic offload capability.

When cloud services manager 450 identifies a registered cloud service provider having adequate resource capacity, the cloud services manager 450 may orchestrate creation of instance 470 on the reserved resource space 460 for off-loading traffic associated with application 402. In this way, during spikes in resource demand on a private cloud infrastructure 410, traffic associated with one or more applications (e.g., application 402) may be quickly and seamlessly offloaded to the public cloud infrastructure 420. In this way, not only may on-prem servers associated with the private cloud infrastructure 410 be prevented from crashing, processing continuity of application 402 is maintained and latencies associate with offloading the associated traffic are minimized.

In aspects, load entity 430 may continue to monitor the resource utilization of application 402 and, in response to determining that the resource utilization falls below the utilization threshold, the load entity 430 may communicate with cloud services manager 450 to destroy instance 470 and migrate application 402 back to private cloud infrastructure 410. In this way, reserved resource space 460 associated with the registered service provider is efficiently freed when it is no longer needed. In further aspects, since utilization of the reserved resource space 460 is transient, the cloud service provider can maximize the number of customers supported on the reserved resource space 460, which is preconfigured to support different applications or applications for different customers that have the same or similar application specifications.

Figure 5:
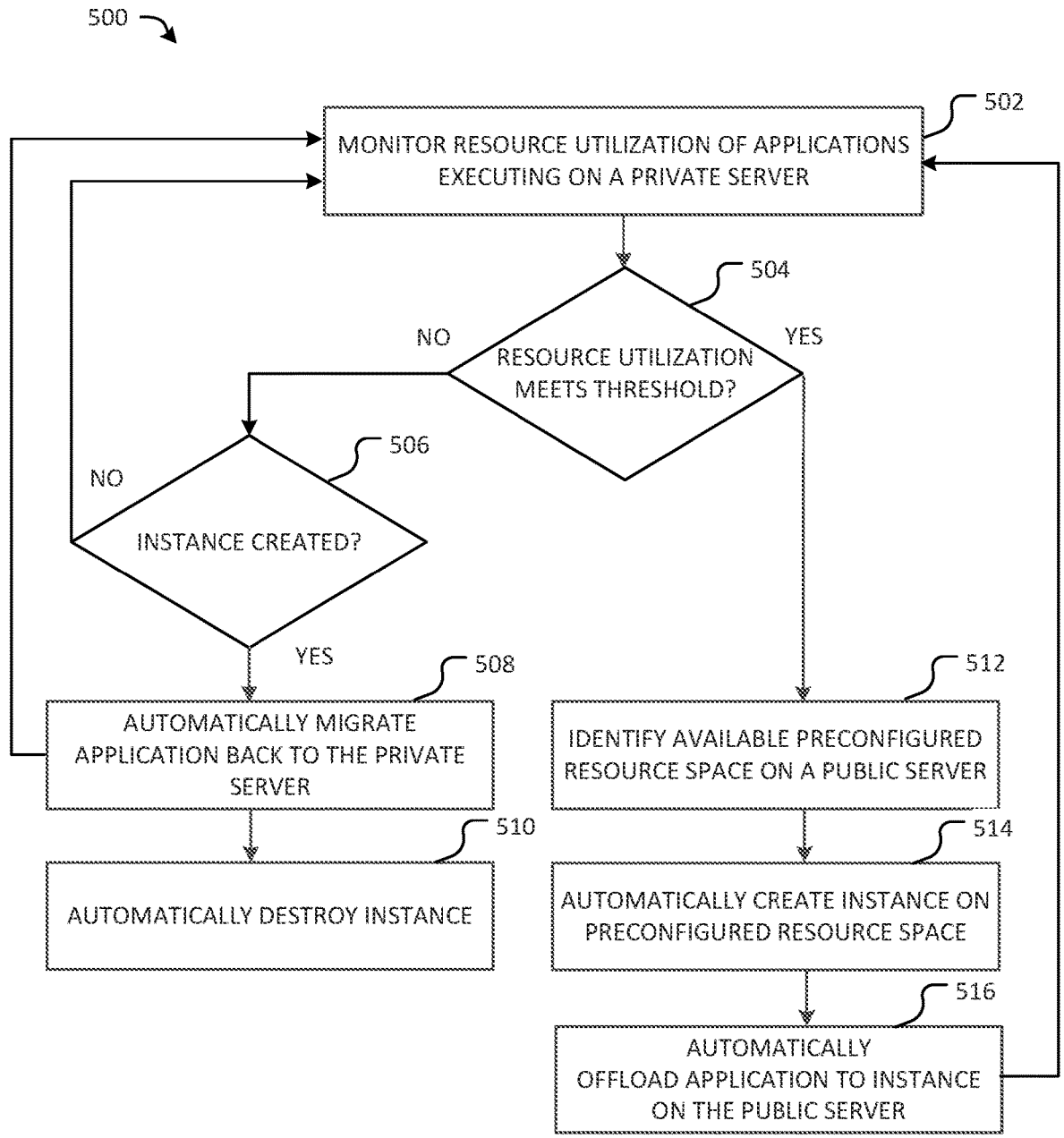
FIG. 5 shows a flowchart of an example method for dynamically off-loading traffic to the public cloud, according to an example embodiment.

FIG. 5 shows a flowchart of an example method for dynamically off-loading traffic to the public cloud, according to an example embodiment. Technical processes shown in this figure will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance of the process to another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by a load application installed on an on-prem server (e.g., a private server) of a private cloud infrastructure, for instance.

Method 500 begins with step 502. At step 502, resource utilization of one or more applications executing on a private server (e.g., an on-prem server) may be monitored. In aspects, monitoring resource utilization may comprise receiving reports from the one or more applications executing on the private server. A report may include resource usage data for an application, which may represent resource utilization of the application. In aspects, a load entity such as load entity 330 and/or load entity 430 described with respect to FIGS. 3-4, respectively. In aspects, the load entity maybe installed on the private server and may act as an API for monitoring the resource utilization of the one or more applications.

At step 504, it may be determined whether the resource utilization of the application meets or exceeds a utilization threshold. If the resource utilization of the application does not meet or exceed the threshold, the method may progress to step 506. If the resource utilization of the application meets or exceeds the threshold, the method may progress to step 512.

At step 506, it may be determined whether an instance had been created for the application on a public server (e.g., a public cloud server). If an instance had been created for the application, the method may progress to step 508. If an instance had not been created for the application, the method may return to step 502.

At step 508, the application may be automatically migrated back to the private server. The method may then return to step 502, where resource utilization of the application may continue to be monitored, e.g., by a load entity.

At step 510, the instance for the application on the public server may be destroyed, thereby releasing resources on a reserved resource space of the public server.

When the resource utilization of the application meets or exceeds the threshold at step 504, available preconfigured resources associated with a reserved resource space of a public server may be identified at step 512. For instance, a cloud services manager (e.g., cloud services manager 350 or cloud services manager 450 described with respect to FIGS. 3-4, respectively) may evaluate resource supply in a public cloud infrastructure and may identify one or more registered cloud service providers having resource capacity in a preconfigured resource space associated with a public server. In some aspects, it may be determined whether the available resource space sufficiently supports an application specification associated with the application. The available resource space may sufficiently support the application specification when the available resource space is preconfigured to support at least some parameters of the application specification.

In response to identifying a registered cloud service provider having adequate resource capacity on a preconfigured resource space, an instance may automatically be created on the preconfigured resource space associated with the public server at step 514. Preconfiguring of the resource space may include advance performance of various actions required for creating an instance, including reserving adequate tenant space, performing IP address allocation, satisfying security requirements, provisioning the reserved resource space, performing testing and/or validation, and the like. In aspects, delays in creating the instance may be minimized due to such preconfiguration of the resource space.

At step 516, traffic associated with the application may automatically be offloaded to the instance created on the public server. In this way, during spikes in resource demand at the private server, traffic associated with the application may be quickly and seamlessly offloaded to the public server. As a result, the private server may be prevented from crashing, while processing continuity for the application may be maintained with little interruption and latencies associate with offloading the traffic may be minimized.

Figure 6:
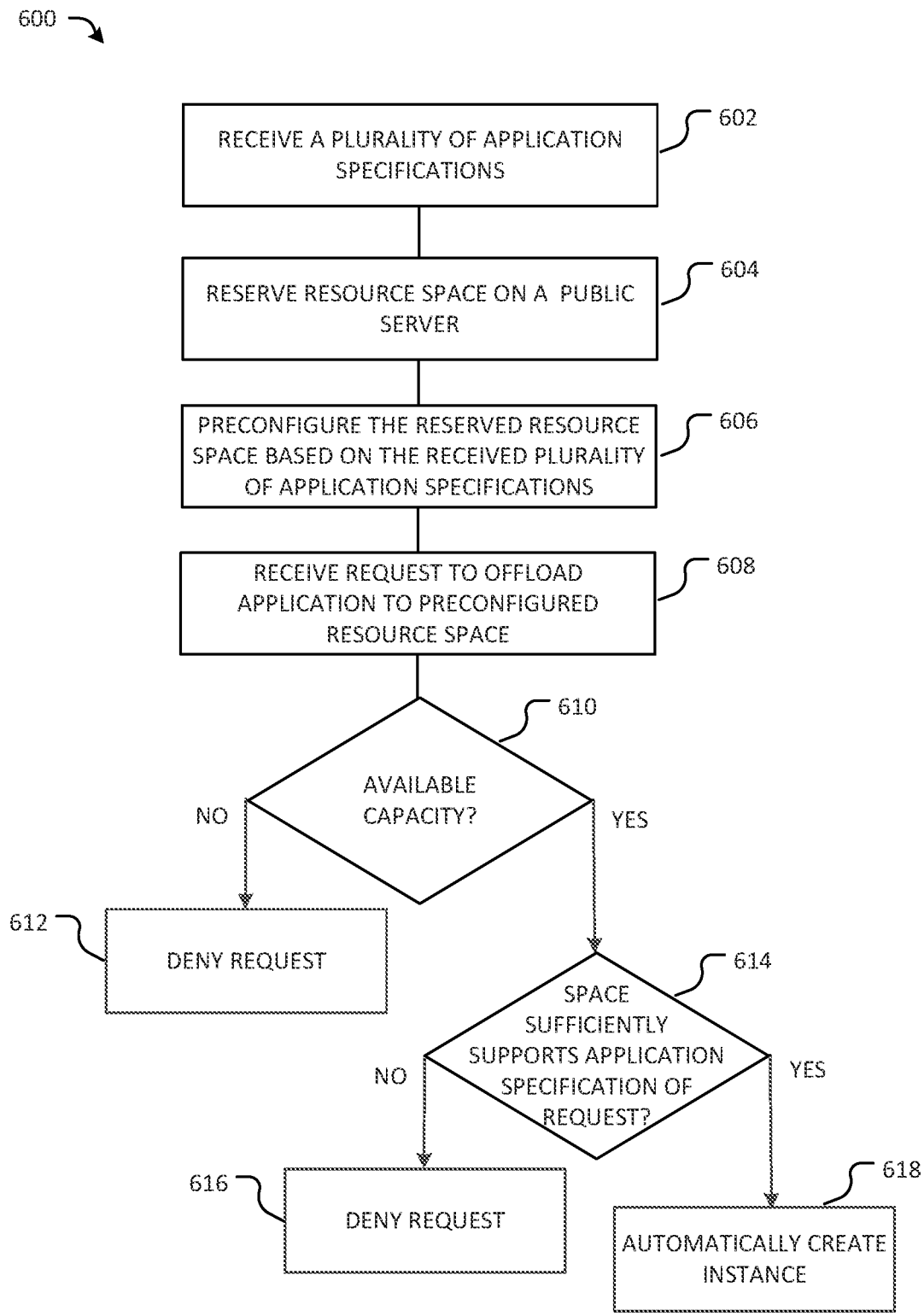
FIG. 6 shows a flowchart of an example method for preconfiguring a resource space on a public server, according to an example embodiment.

FIG. 6 shows a flowchart of an example method for preconfiguring a resource space on a public server, according to an example embodiment. Technical processes shown in this figure will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 6. Steps may be performed serially, in a partially overlapping manner, or fully in parallel. Thus, the order in which steps of method 600 are performed may vary from one performance of the process to another performance of the process. Steps may also be omitted, combined, renamed, regrouped, be performed on one or more machines, or otherwise depart from the illustrated flow, provided that the process performed is operable and conforms to at least one claim. The steps of FIG. 6 may be performed or orchestrated by a cloud services manager of registered cloud service providers associated with a public cloud server (e.g., public server) of a public cloud infrastructure, for instance.

Method 600 begins with step 602. At step 602, a plurality of application specifications may be received. An application specification may define one or more parameters for executing an application. Among other things, the parameters may include resource requirements, specific or generalized provisioning, security requirements, testing or validation requirements, and the like. In aspects, the parameters may differ for different types of applications, such as applications for processing mobile traffic vs. applications for providing databases vs. applications providing websites.

At step 604, one or more registered cloud service providers may reserve resource space on one or more public cloud servers (e.g., public servers). The reserved resource space may be associated with an IP address allocation, for instance.

At step 606, the reserved resource space may be preconfigured based on the received plurality of application specifications. In aspects, the reserved resource space may be preconfigured to sufficiently support the plurality of application specifications. In aspects, a "sufficient preconfiguration" may refer to preconfiguring resources to meet at least a subset of the application specifications for an application or a type of application for a temporary period of time. Preconfiguring resources may include advance performance various actions that may be required for creating an instance on the reserved resource space, including reserving adequate tenant space, performing IP address allocation, satisfying security requirements, provisioning the reserved resource space, and performing testing and/or validation.

At step 608, a request to offload an application to the preconfigured resource space. For instance, a cloud services manager associated with a public cloud infrastructure may receive a request from a load entity associated with a private cloud infrastructure. In some aspects, the request may include an application specification associated with the application.

At step 610, it may be determined whether capacity is available on a preconfigured resource space. In aspects, a preconfigured resource space associated with a particular cloud service provider may be at least partially occupied by one or more on-prem systems (e.g., customers) at any one time. As a result, it is contemplated that the cloud services manager may have relationships with multiple cloud service providers to ensure capacity is available when needed for offloading traffic. If capacity is not available on a preconfigured resource space of a registered service provider, the method may progress to step 612. If capacity is available on a preconfigured resource space of a registered service provider, the method may progress to step 614.

At step 612, the request to offload traffic may be denied. It should be appreciated that due to the dynamic nature of the described system, the same or similar request to offload traffic may be accepted at another time.

At step 614, it may be determined whether the available preconfigured resource space sufficiently supports the application specification of the request. As described above, a "sufficient preconfiguration" may refer to preconfiguration of resources that supports at least a subset of the application specifications for the application or type of application associated with the request. In aspects, parameters of application specifications may differ for different types of applications, such as applications for processing mobile traffic vs. applications for providing databases vs. applications providing websites. When the available preconfigured resource space sufficiently supports an application specification, the preconfigured resource space meets at least some of the parameters associated with the application specification. If the available preconfigured resource space does not sufficiently support the application specification of the request, the method may progress to step 616. If the available preconfigured resource space sufficiently supports the application specification of the request, the method may progress to step 618.

At step 616, the request to offload traffic may be denied. It should be appreciated that due to the dynamic nature of the described system, the same or similar request to offload traffic may be accepted at another time.

At step 618, an instance is automatically created on the preconfigured resource space for offloading the application and associated traffic. Preconfiguring of the resource space may include advance performance of various actions required for creating an instance, including reserving adequate tenant space, performing IP address allocation, satisfying security requirements, provisioning the reserved resource space, performing testing and/or validation, and the like. In aspects, delays in creating the instance may be minimized due to such preconfiguration of the resource space.

Figure 7:
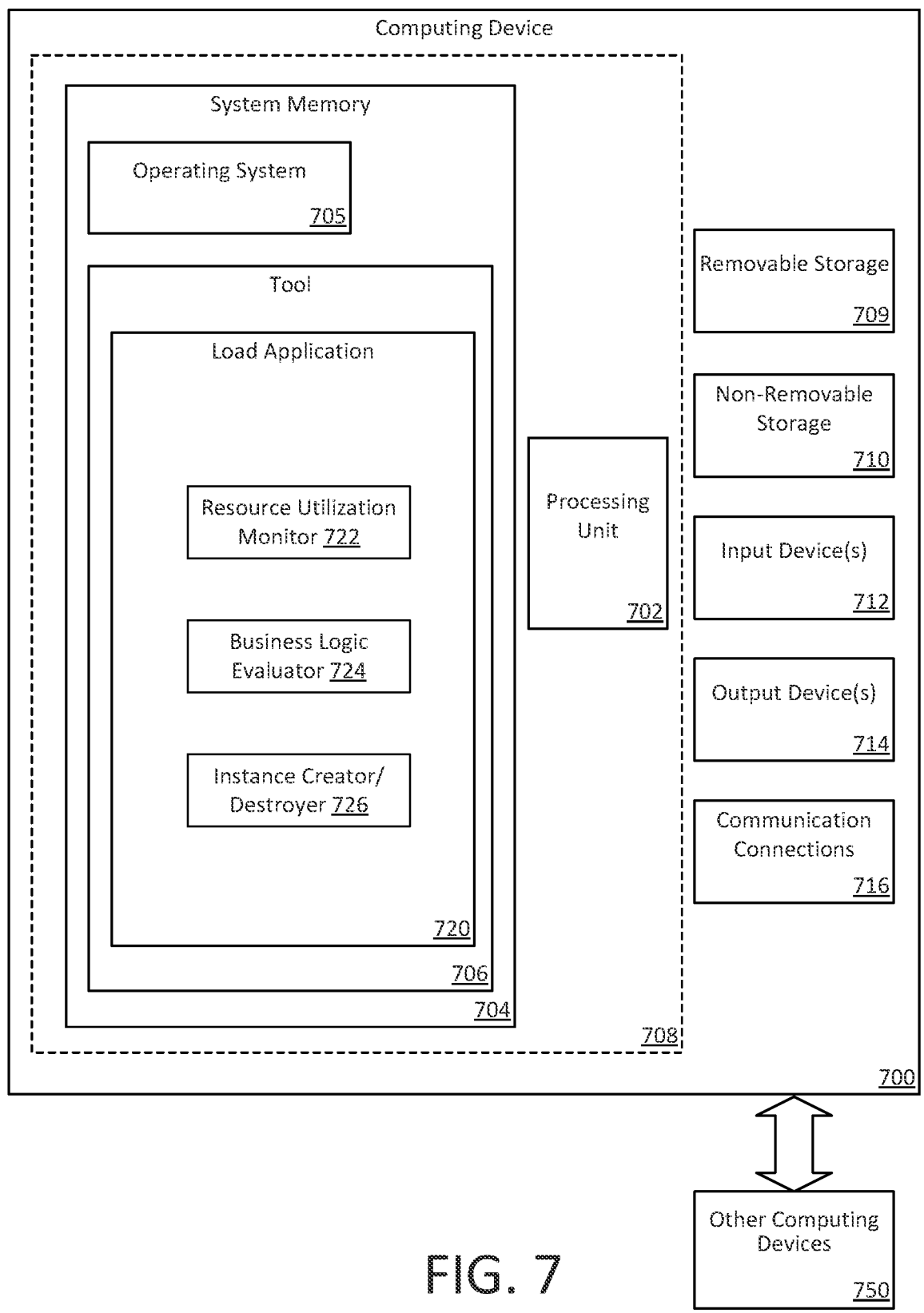
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system.

This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools 706 and data files may be stored in the system memory 704. While executing on the at least one processing unit 702, the program tools 706 (e.g., load application 720) may perform processes including, but not limited to, the aspects, as described herein. The load application 720 includes a resource utilization monitor 722, a business logic evaluator 724, and an instance creator/destroyer 726, as described in more detail above. Other program tools 706 that may be used in accordance with aspects of the present disclosure may include mobile data processing applications, RAN service applications, database applications, website applications, and the like.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc., may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. In aspects, computer storage media is non-transitory and does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
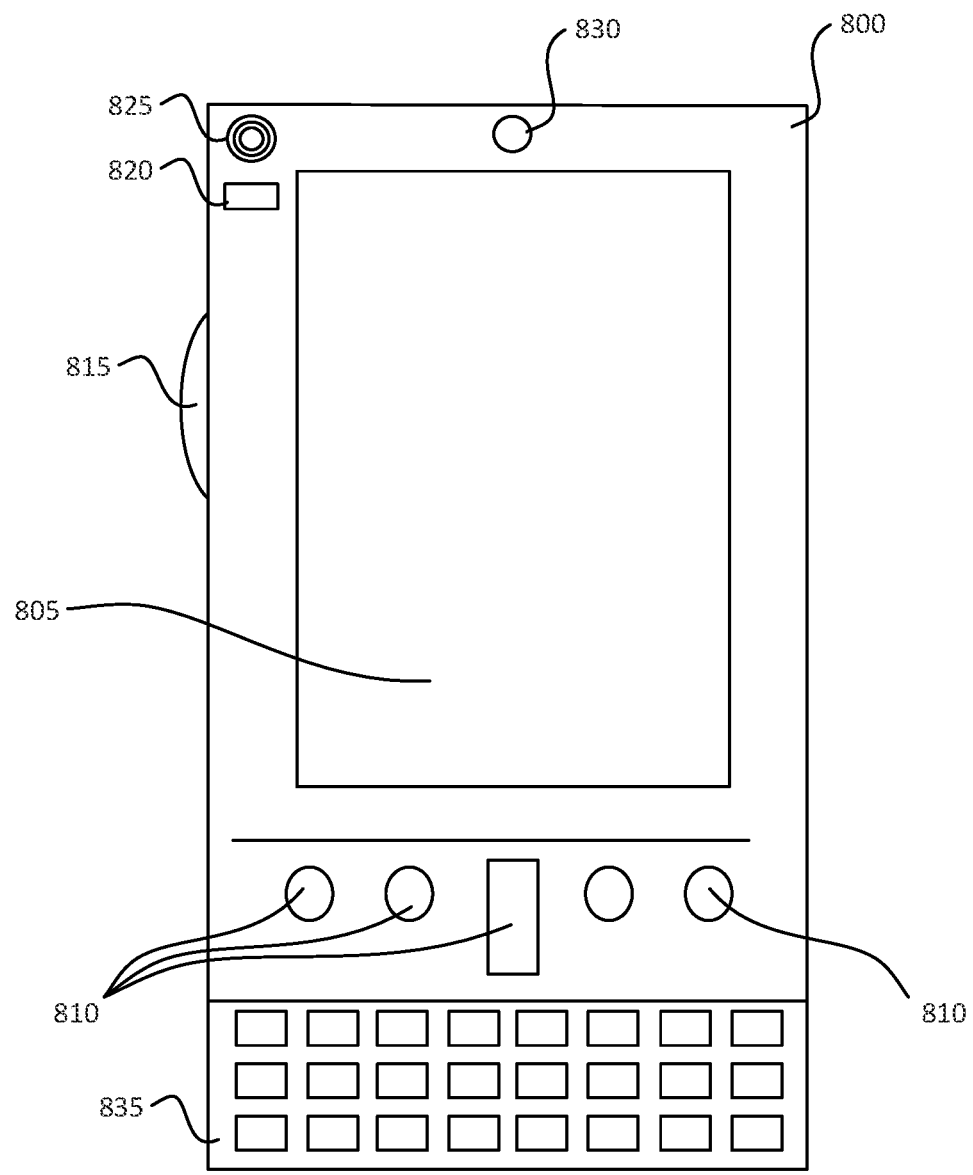
FIGS. 8A and 8B are simplified block diagrams of a mobile computing device with which aspects of the present disclosure may be practiced.
Figure 8B:
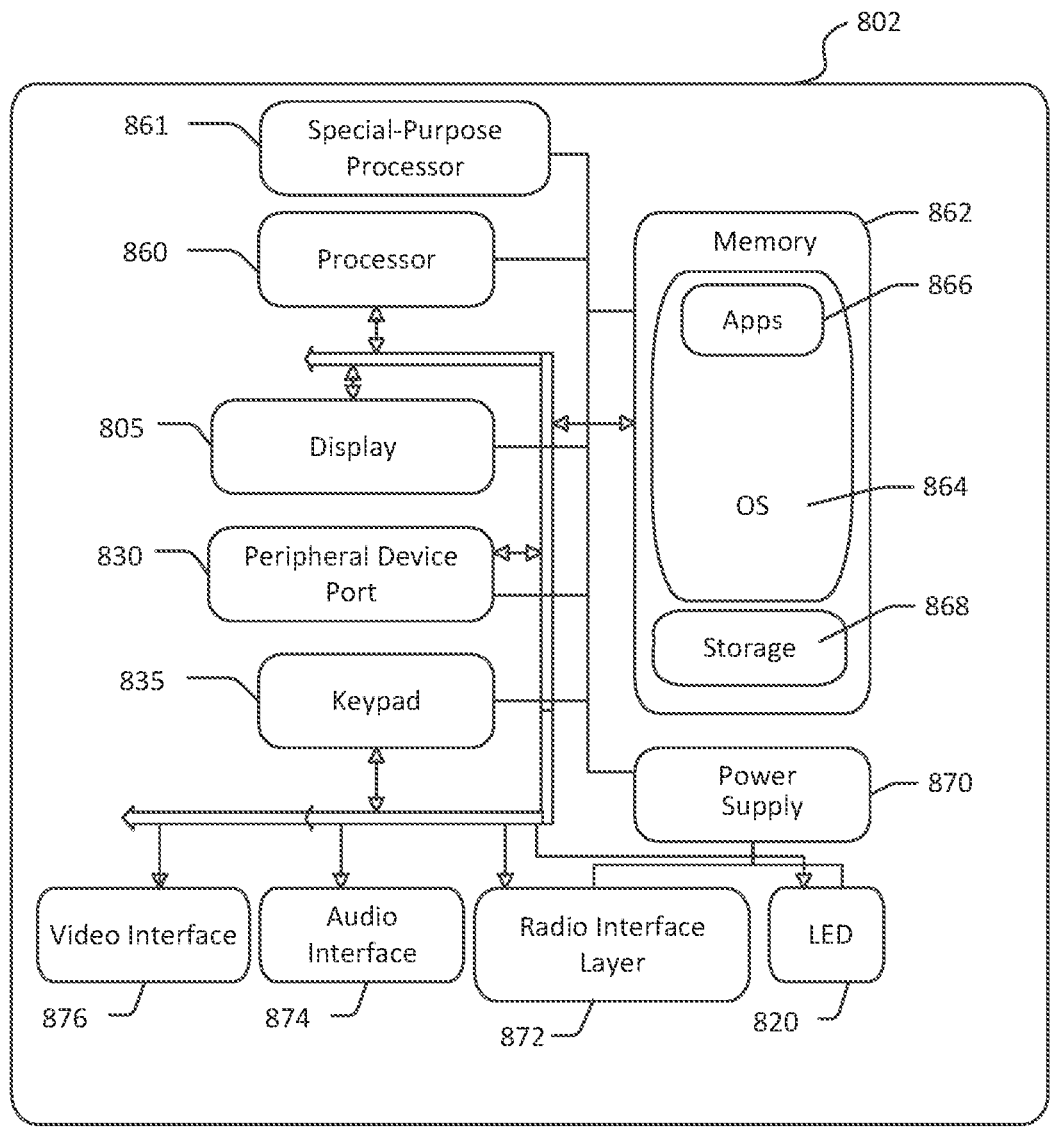

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., an operator of an on-prem server described in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or fewer input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., the on-prem and public cloud servers described with respect to FIGS. 1-4), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include mobile data processing applications, RAN service applications, database applications, website applications, phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world" via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

In an aspect, a method for dynamically offloading traffic from a private server to a public server is provided. The method includes monitoring a resource utilization of an application executing on a private server, where the application is configured to perform at least one operation based on an application specification. Additionally, in response to determining that the resource utilization of the application meets a utilization threshold, the method includes identifying a public server having a reserved resource space that is preconfigured to sufficiently support at least a portion of the application specification. The method further includes automatically creating an instance on the preconfigured resource space of the public server and automatically offloading the application to the preconfigured resource space of the public server.

In further aspects, the method includes monitoring resource utilization of the application on the preconfigured resource space and, in response to determining that the resource utilization of the application is below the utilization threshold, automatically migrating the application back to the private server. Additionally, the method includes automatically eliminating the instance on the preconfigured resource space of the public server. The method further includes determining an available capacity of the preconfigured resource space on the public server. For instance, the method includes sending a request to identify the public server having the reserved resource space that is preconfigured to sufficiently support at least the portion of the application specification. The method, where monitoring the resource utilization of the application includes receiving a report from the application, and where the report includes resource usage data for the application. Additionally, the method includes using a hysteresis model to determine that the resource utilization of the application meets the utilization threshold. The method, where preconfiguring the reserved resource space includes advance performance of one or more actions for creating the instance, and where the one or more actions include at least one of: reserving adequate tenant space, performing IP address allocation, satisfying security requirements, provisioning the reserved resource space based on the application specification, or performing validation. Additionally, the method includes eliminating at least one action of the one or more actions for creating the instance based on advance performance of the at least one action during preconfiguration of the reserved resource space.

In another aspect, a system for preconfiguring a resource space on a public server is provided. The system includes computer-executable instructions that when executed by a processor cause the system to perform operations. The operations include receiving a plurality of application specifications, where each application specification defines one or more parameters for executing a particular application or a type of application. The operations further include reserving resource space on a public server and preconfiguring the reserved resource space based on the received plurality of application specifications. Additionally, the operations include receiving a request to offload an application from a private server to the preconfigured resource space of the public server, where the application is associated with an application specification. The operations further include determining that the preconfigured resource space supports at least a portion of the application specification and automatically creating an instance on the preconfigured resource space.

In aspects, the computer-executable instructions when executed by a processor cause the system to perform further operations. The operations including determining whether the preconfigured resource space has available capacity for offloading the application to the public server. In response to determining that the preconfigured resource space does not have available capacity, the operations include denying the request. Additionally, the operations include orchestrating offloading of the application to the created instance on the preconfigured resource space. The system of claim 10, wherein preconfiguring the reserved resource space includes advance performance of one or more actions for creating the instance, and wherein the one or more actions include: reserving adequate tenant space, performing IP address allocation, satisfying security requirements, provisioning the reserved resource space based on the application specification, or performing validation. The further operations including eliminating at least one action of the one or more actions for creating the instance based on advance performance of the at least one action during preconfiguration of the reserved resource space.

In yet another aspect, a system for dynamically offloading traffic from a private server to a public server is provided. The system includes computer-executable instructions that when executed by a processor cause the system to perform operations. The operations include monitoring a resource utilization of an application executing on a private server, where the application is configured to perform at least one operation based on an application specification. In response to determining that the resource utilization of the application meets a utilization threshold, the operations include identifying a public server having a reserved resource space that is preconfigured to sufficiently support at least a portion of the application specification. Additionally, the operations include determining an available capacity of the preconfigured resource space on the public server. In response to determining that the preconfigured resource space has available capacity, the operations include automatically creating an instance on the preconfigured resource space of the public server and automatically offloading the at least one application to the preconfigured resource space of the public server.

In aspects, the computer-executable instructions when executed by a processor cause the system to perform further operations. The operations including monitoring resource utilization of the application on the preconfigured resource space and, in response to determining that the resource utilization of the application is below the utilization threshold, automatically migrating the application back to the private server and automatically eliminating the instance on the preconfigured resource space of the public server. Additionally, the operations include using a hysteresis model to determine that the resource utilization of the application meets the utilization threshold. The system, where monitoring the resource utilization of the application includes receiving a report from the application, and where the report includes resource usage data for the application.

Any of the one or more above aspects in combination with any other of the one or more aspect. Any of the one or more aspects as described herein.

What is claimed is:

1. A method for dynamically offloading traffic from a private server to a public server, the method comprising:
    obtaining an application specification that defines a parameter for performing an operation of an application, the parameter including at least one of a security requirement, a testing requirement, or a validation requirement;
    preconfiguring a resource space at a public server of a registered cloud service provider based on the parameter for performing the operation of the application;
    monitoring a resource utilization of the application executing on a private server; and
    in response to determining that the resource utilization of the at least one application meets a utilization threshold:
        identifying the registered cloud service provider as having adequate resource capacity on the preconfigured resource space;
        automatically creating an instance on the preconfigured resource space of the public server; and
        automatically offloading the application to the preconfigured resource space of the public server.

2. The method of claim 1, further comprising:
    monitoring resource utilization of the application on the preconfigured resource space; and
    in response to determining that the resource utilization of the one application is below the utilization threshold, automatically migrating the application back to the private server.

3. The method of claim 2, further comprising:
automatically eliminating the instance on the preconfigured resource space of the public server.

4. The method of claim 1, further comprising:
determining an available capacity of the preconfigured resource space on the public server.

5. The method of claim 1, further comprising:
sending a request to identify the public server having the reserved resource space that is preconfigured to sufficiently support at least the portion of the application specification.

6. The method of claim 1, wherein monitoring the resource utilization of the application comprises receiving a report from the at application, and wherein the report comprises resource usage data for the application.

7. The method of claim 1, further comprising:
using a hysteresis model to determine that the resource utilization of the application meets the utilization threshold.

8. The method of claim 1, wherein preconfiguring the reserved resource space includes advance performance of one or more actions for creating the instance, and wherein the one or more actions include at least one of reserving adequate tenant space, performing IP address allocation, satisfying security requirements, provisioning the reserved resource space based on the application specification, or performing validation.

9. The method of claim 1, further comprising:
eliminating at least one action of the one or more actions for creating the instance based on advance performance of the at least one action during preconfiguration of the reserved resource space.

10. The method of claim 1, wherein automatically creating the instance comprises validating, after the instance is created, that the instance satisfies the one or more parameters for performing the at least one operation of the at least one application.

11. The method of claim 1, wherein automatically offloading the application comprises continuing execution of the application the private server, thereby offloading a portion of processing for the application from the private server to the public server.

12. A system for dynamically offloading traffic from a private server to a public server, the system comprising computer-executable instructions that when executed by a processor cause the system to perform operations, comprising:

obtaining an application specification that defines a parameter for performing an operation of an application, the parameter including at least one of a security requirement, a testing requirement, or a validation requirement;

preconfiguring a resource space at the public server of a registered cloud service provider based on the parameter for performing the operation of the application;

monitoring a resource utilization of the application executing on the private server; and in response to determining that the resource utilization of the at least one application meets a utilization threshold:
identifying the registered cloud service provider as having adequate resource capacity on the preconfigured resource space;
automatically creating an instance on the preconfigured resource space of the public server; and
automatically offloading the application to the preconfigured resource space of the public server.

13. The system of claim 12, the computer-executable instructions when executed causing the system to perform further operations, comprising:
monitoring resource utilization of the application on the preconfigured resource space; and
in response to determining that the resource utilization of the application is below the utilization threshold, automatically migrating the application back to the private server.

14. The system of claim 13, the computer-executable instructions when executed causing the system to perform further operations, comprising:
automatically eliminating the instance on the preconfigured resource space of the public server.

15. The system of claim 12, the computer-executable instructions when executed causing the system to perform further operations, comprising:
using a hysteresis model to determine that the resource utilization of the application meets the utilization threshold.

16. The system of claim 12, wherein monitoring the resource utilization of the application comprises receiving a report from the application, and wherein the report comprises resource usage data for the application.

* * * * *